(12) United States Patent
Babitch

(10) Patent No.: US 8,912,956 B2
(45) Date of Patent: Dec. 16, 2014

(54) COOPERATIVE CALIBRATION OF PLATFORM SHARED VOLTAGE CONTROLLED OSCILLATOR

(75) Inventor: Daniel Babitch, San Jose, CA (US)

(73) Assignee: CSR Technology Inc., San Jose, CA (US)

( * ) Notice: Subject to any disclaimer, the term of this patent is extended or adjusted under 35 U.S.C. 154(b) by 363 days.

(21) Appl. No.: 13/416,274

(22) Filed: Mar. 9, 2012

(65) Prior Publication Data

US 2013/0234887 A1    Sep. 12, 2013

(51) Int. Cl.
*G01S 19/23*    (2010.01)
(52) U.S. Cl.
USPC ..................................... 342/357.62
(58) Field of Classification Search
USPC ............................ 342/357.62, 357.75, 357.77
See application file for complete search history.

(56) References Cited

U.S. PATENT DOCUMENTS 7,010,307 B2 * 3/2006 Abraham .................... 455/456.1
2003/0154025 A1 * 8/2003 Fuchs et al. .................... 701/213

FOREIGN PATENT DOCUMENTS

| WO | WO 01/86316 | 11/2001 |
| WO | WO 03/073629 | 9/2003 |
| WO | WO 2010/125388 | 11/2010 |

OTHER PUBLICATIONS

GB Search Report for GB Appln. No. 1302126.6, dated Jul. 29, 2013.

* cited by examiner

*Primary Examiner* — Harry Liu
(74) *Attorney, Agent, or Firm* — RatnerPrestia

(57) ABSTRACT

A mobile communication device includes a global navigation satellite system (GNSS) receiver for receiving GNSS signals, a radio frequency (RF) receiver for receiving RF signals and a voltage controlled oscillator supplying an oscillator signal to the GNSS receiver and the RF receiver. The GNSS receiver and the RF receiver use the oscillator signal to receive the GNSS signals and the RF signals. The mobile communication device also includes a processor for initializing and/or adjusting a model of a frequency behavior of the voltage controlled oscillator, and uses the model to track the GNSS signals when computing a location of the mobile communication device.

20 Claims, 3 Drawing Sheets

COOPERATIVE CALIBRATION OF PLATFORM SHARED VOLTAGE CONTROLLED OSCILLATOR

This application relates, in general, to a method and a system for sharing a voltage controlled oscillator between a global navigation satellite system (GNSS) receiver and a radio frequency (RF) receiver. Specifically, the GNSS receiver initializes and/or updates a model of a frequency behavior of the voltage controlled oscillator in order to track GNSS signals.

BACKGROUND OF THE INVENTION

Conventional mobile devices (e.g., a mobile phone) may include a GNSS receiver and a RF receiver (e.g., a cellular modem). In general, the mobile phone may include a voltage controlled temperature compensated crystal oscillator (VC-TCXO) that is used by the cellular modem to receive cellular signals. The mobile phone may also include a separate temperature compensated crystal oscillator (TCXO) that is utilized by the GNSS receiver to receive satellite signals. These conventional systems, generally suffer from an increase in cost and size due to having two separate expensive temperature compensated oscillators for the GNSS receiver and cellular modem respectively.

SUMMARY OF THE INVENTION

The present invention is embodied in a mobile communication device including a global navigation satellite system (GNSS) receiver for receiving GNSS signals, a radio frequency (RF) receiver for receiving RF signals and a voltage controlled oscillator supplying an oscillator signal to the GNSS receiver and the RF receiver. The GNSS receiver and the RF receiver use the oscillator signal to receive the GNSS signals and the RF signals. The mobile communication device also includes a processor that adjusts a model of a frequency behavior of the voltage controlled oscillator, and that uses the model to track the GNSS signals when computing a location of the mobile communication device. It is understood that the foregoing general description and the following detailed description are exemplary, but not restrictive of the invention.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following Figures.

DETAILED DESCRIPTION OF THE INVENTION

As will be described, the example embodiments provide a mobile communication device including a GNSS receiver and a cellular modem that share a common voltage controlled oscillator. The mobile device is able to initialize and adjust a model of the frequency behavior of the voltage controlled oscillator when the voltage controlled oscillator is not being used by the cellular modem. This model is then used by the GNSS receiver to compensate for the frequency adjustments made by the cellular modem during cellular reception, thereby allowing the GNSS receiver to accurately track GNSS signals during operation of the cellular modem.

In one example, the mobile device may include a voltage controlled temperature compensated oscillator (VC-TCXO) that is shared by both a GNSS receiver and a RF receiver (e.g., a cellular modem). In this example, the VC-TCXO is the common reference frequency source used on the platform. During operation, the cellular modem may continually adjust the output frequency signal of the VC-TCXO during reception of cellular signals. These adjustments may have adverse effects on the GNSS receiver, because the GNSS receiver has difficulty working with a reference where extraneous frequency adjustments are being made (i.e. GNSS receivers are sensitive to reference frequency perturbations).

Figure 1:
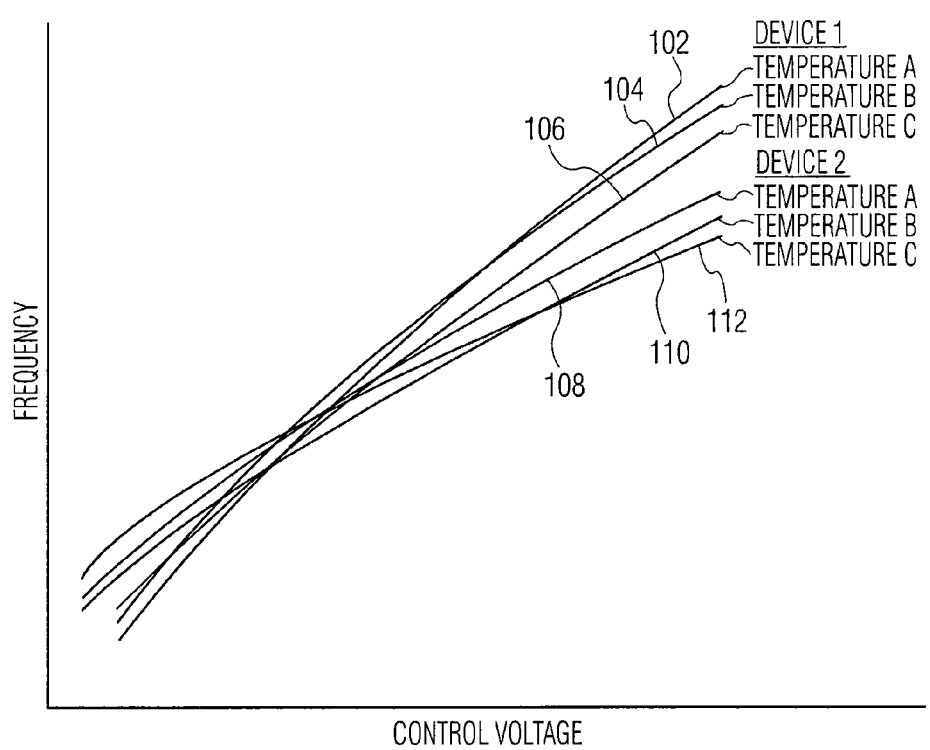
FIG. 1 is a data plot showing the frequency stability of two different voltage controlled oscillators for a common control voltage at three different operating temperatures, according to an embodiment of the present invention.

Shown in FIG. 1 are the respective transfer functions (102, 104 and 106) and (108, 110 and 112) illustrating the frequency behavior for two VC-TCXOs (Device 1 and Device 2) of the same make and model, operating at three different temperatures (A, B and C).

It is shown that plots 102, 104 and 106 for device 1 are not identical to each other due to the different operating temperatures (i.e. device 1 behaves differently at different temperatures). It is also shown that plots 108, 110 and 112 for device 2 are not identical to each other due to the different operating temperatures (i.e. device 2 also behaves differently at different temperatures).

It is shown that even though device 1 and device 2, in this example, are the same make and model, they operate differently from each other at common operating temperatures (i.e. plots 102 for device 1 and 108 for device 2 show different behaviors at a common temperature A). Furthermore, if device 1 and device 2 where of different makes and/or models, the difference in behavior would be even more significant than shown in FIG. 1.

Thus, depending on the manufactured VC-TCXO and its operating temperature, the frequency stability may be skewed. This may be a problem for the GNSS receiver which continually tracks the reference frequency of the VC-TCXO as it is perturbed. In general, VC-TCXOs typically have +/−15 PPM of adjustment range on their tuning input. However, the GNSS receiver should know the initial frequency to better than 0.5 PPM and subsequent changes to within a few PPB.

One method to perform this frequency tracking operation is for the platform host to tell the GNSS receiver when and what adjustments are being made by the cellular modem. However, this process may be burdensome for the host. Another method for performing this frequency tracking operation is for the GNSS receiver to repeatedly measure the control voltage to predict the resulting reference frequency. One problem with this method is that the frequency of the voltage controlled oscillator output signal is also dependent on the operating temperature of the voltage controlled oscillator.

Figure 2:
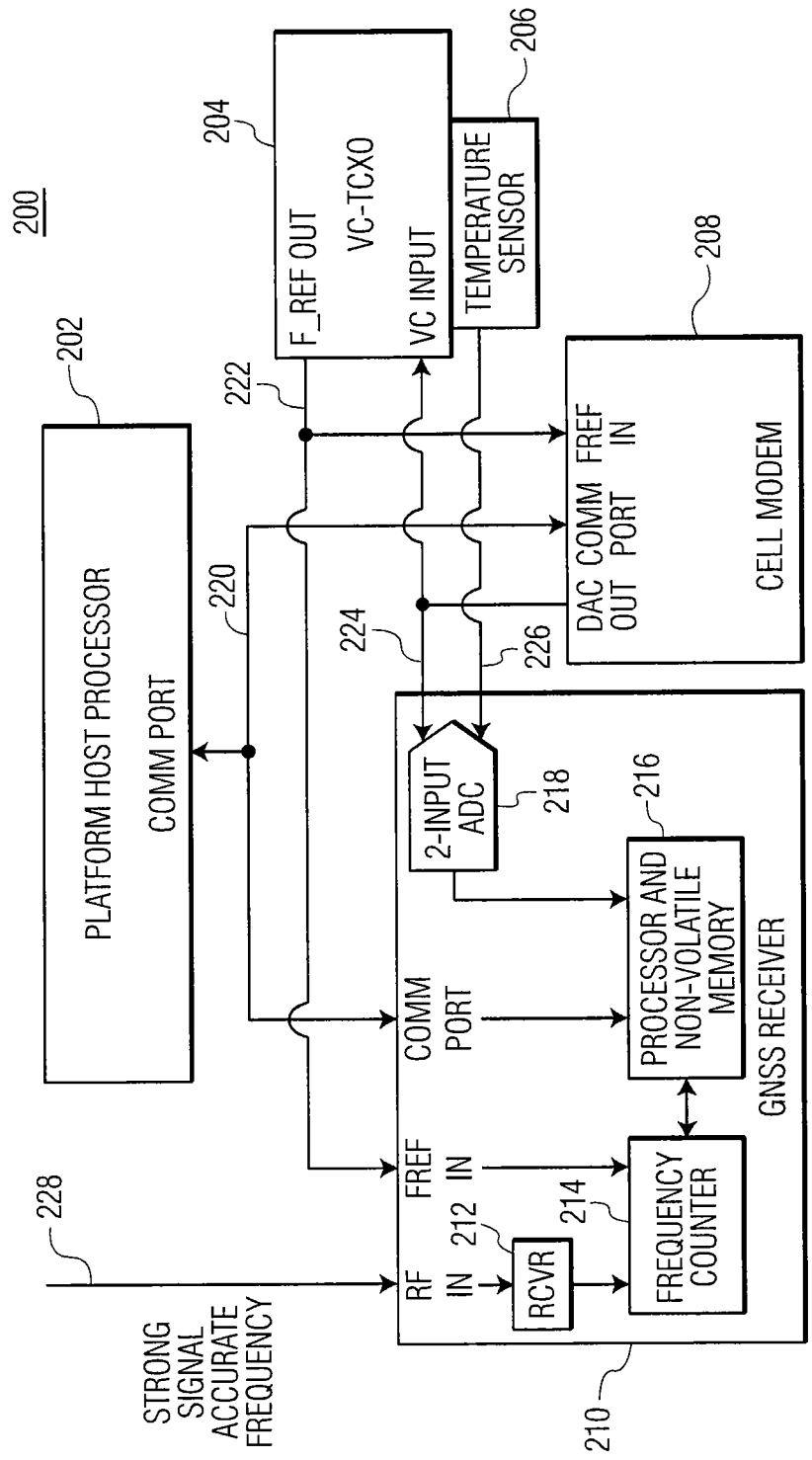
FIG. 2 is a block diagram showing a configuration of the GNSS receiver and cellular modem in the mobile device, according to an embodiment of the present invention.

FIG. 2 shows an example embodiment of the mobile device. The mobile device may include a GNSS receiver 210, a cellular modem 208, a platform host processor 202 and a VC-TCXO 204 common to both receivers. During operation, host 202 may control the GNSS receiver and cellular modem via control lines 220.

During operation, the control signal generated by cellular modem 208 is output on line 224 for controlling the reference frequency of VC-TCXO 204. This voltage is also input to an analog to digital converter (ADC) 218 of GNSS receiver where it is stored in memory 216. The measured operating temperature (measured by sensor 206) may also be digitized by ADC 218 and stored in memory 216 of the GNSS receiver.

In general, the host processor may utilize the measured temperature and control voltage stored in memory 216 along with a comparison (e.g. a difference) between the frequency of the voltage controlled oscillator signal on line 222 and a reference signal received on line 228 through receiver 212. This difference signal along with the operating temperature of the voltage controlled oscillator and the control voltage of the voltage controlled oscillator may be utilized by the host processor to initialize and/or adjust a model (e.g. a multidimensional polynomial curve fit) of frequency versus operating temperature, versus control voltage (i.e. a transfer function).

In a first operating mode (i.e. cellular reception mode), during cellular reception, cellular modem 208 controls the VC control signal input of voltage controlled oscillator 204. This effectively adjusts the frequency of the oscillator signal output on line 222. This output oscillator signal is then utilized at ports FREF In of both the GNSS receiver and the cellular modem for receiving the GNSS signals and the cellular signals respectively. When receiving the GNSS signals, the GNSS receiver calculates the frequency error between the oscillator signal and at least one of the received GNSS signals. Specifically, the GNSS receiver may utilize the model to compensate for the time varying nature (i.e. varied by the cellular receiver) of the oscillator signal when calculating the frequency error.

In a second operating mode (i.e. modeling mode), when the host processor 202 determines that the cellular modem is not receiving cellular signals, it then performs a model adjustment procedure in order to initialize and/or adjust a model of the frequency behavior of the voltage controlled oscillator. In the model adjustment procedure, the host processor 202 instructs the cellular modem 208 to step the control voltage VC on line 224 through a complete dynamic range. As the voltage is being applied on line 224, it is also digitized and stored in memory 216 of the GNSS receiver along with the digitized operating temperature. As the frequency is being varied with respect to the control voltage, the oscillator signal output by the voltage controlled oscillator on line 222 is input to frequency counter 214. Another signal which may be used as a reference signal is also input on line 228, through receiver 212 and into frequency counter 214. This reference signal may be one of the strong GNSS signals or a manufacturer generated continuous wave (CW) signal, and may also be corrected for Doppler shift by the GNSS receiver. The host processor 202 then determines the difference between the frequencies of the reference signal and the oscillator signal based on the counter values. This difference is then utilized along with stored operating temperature and the respective control voltage to initialize and/or adjust the model that is used by the GNSS receiver during the first operating mode to receive the GNSS signals.

When the cellular modem begins receiving the cellular signals, the GNSS receiver then utilizes the model to account (i.e. compensate) for the frequency variations, and to more accurately estimate the frequency of the oscillator signal output by the VC-TCXO (i.e., the GNSS receiver maps the operating temperature and the control voltage to a specific operating frequency of the voltage controlled oscillator 204 based on the model).

In general, the model may be initialized during manufacturing of the mobile product. This provides the user with an out-of-the-box GNSS experience that is favorable. This initialization may be performed during the manufacturing process with a generated CW signal being utilized as the reference signal on line 228, and at the ambient temperature of the manufacturing plant.

In order to improve on the initial model, the modeling operation may then be repeatedly performed at later times by the host processor. These adjustments may be performed across a wide range of operating temperatures of the voltage controlled oscillator in order to better describe the frequency of the oscillator signal with respect to the control voltage and the operating temperature (i.e. help the processor to better estimate the frequency of the oscillator signal when GNSS signals are being received).

In general, the temperature sensor 206 may be located either physically adjacent to, or inside of the VC-TCXO. And in general, three measurements may be taken during the modeling process. A frequency measurement, a measurement of the VC input control voltage and a measurement of the VC-TCXO device operating temperature. A sufficient number of sets (voltage steps) are utilized to sufficiently and accurately model any non-linearity of the VC-TCXO transfer function. In the initial modeling, which could be done in the factory, the temperature may be stabilized for simplicity. However, this is not a requirement. The initial model and adjusted model may also be stored in non-volatile memory (e.g., memory 216 of the GNSS receiver) so that it will not be lost when the GNSS is powered off.

In the field, the initial model initialized by the manufacturer in the factory may be used for the first GNSS acquisitions of the GNSS signals. The GNSS measures the VC control voltage, measures the operating temperature of the VC-TCXO, and then uses the stored model to estimate the frequency of the voltage controlled oscillator based on these measurements. In general, modeling is performed when the host processor determines that cellular modem 208 is not currently receiving cellular signals, and that the GNSS signals have a power above a predetermined threshold.

Figure 3:
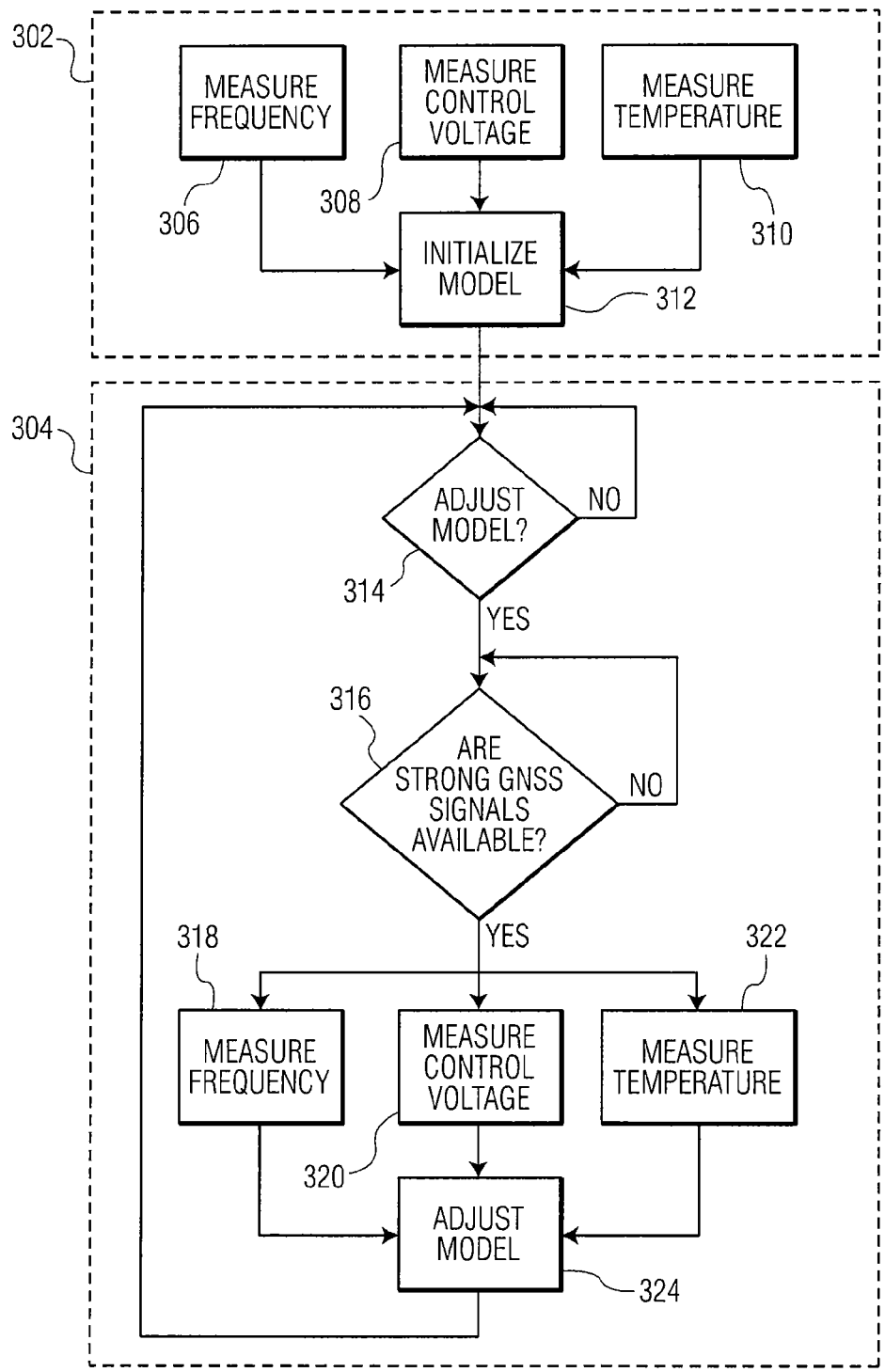
FIG. 3 is a flow chart of the operation of the mobile device in FIG. 2 for computing and adjusting a model of the frequency behavior of the voltage controlled oscillator, according to an embodiment of the present invention.

Shown in FIG. 3 is a flow chart of the operation for developing and adjusting the frequency model of the voltage controlled oscillator. In block 302, the model is initialized (e.g. by the manufacturer), and in block 304, the initial model is repeatedly adjusted during operation of the mobile device.

As shown in block 302, the frequency of both the oscillator signal and the reference signal (i.e., the CW signal generated by the manufacturer) are measured (S306). A comparison (e.g. a difference) may be computed between these two frequencies. The control voltage applied to voltage controlled oscillator 204 is also measured using the ADC of the GNSS receiver (S308). Furthermore, the operating temperature output from temperature sensor 206 is also obtained by the GNSS receiver (S310). The GNSS receiver or the host processor is then able to utilize the measured frequency difference between the signals, the measured control voltage and the measured temperature to initialize a three-dimensional model of the frequency behavior of the voltage controlled oscillator 204.

The model may be initialized and/or adjusted, for example, by storing a number of data points (e.g. control voltage data points, operating temperature data points and oscillator signal frequency data points) and fitting a three-dimensional surface to the measured data points. Alternatively, the model may be a set of stored data points and the estimated frequency may be determined by interpolating among the data points.

In general, (not shown), the mobile device may utilize the initial model so that the GNSS receiver 210 is able to track the GNSS signals. This is beneficial when the cellular modem is adjusting the frequency of the oscillator signal during cellular reception. As described above, the initial model may be improved upon (i.e., adjusted) at certain times during operation of the mobile device. It is noted that the model may be adjusted based on a periodic schedule, based on the measured temperature of the voltage controlled oscillator (i.e., if the voltage controlled oscillator is operating in temperatures that have not yet been modeled), or based on other parameters (e.g. an elapsed usage time).

In general, as long as the cellular modem is not receiving cellular signals, the modeling procedure may be performed (i.e. the cellular modem is free to vary the control voltage for modeling purposes). In one example, the mobile device first determines if the model may be adjusted (S314). If it is determined that the model cannot be adjusted (i.e., the cellular modem is currently receiving cellular signals), then the system returns to (S314). If it is determined the model may be adjusted (i.e., the cellular modem is not receiving cellular signals), then the process determines if a reference signal (e.g., a GNSS signal) having adequate quality of the estimated frequency for improving the model is available (S316). If a strong GNSS signal is not available, then the process returns to (S316). However, if a strong GNSS signal is available, then the process proceeds to (S318), (S320) and (S322) where the various parameters are again measured.

Specifically, in S318, the frequency between the reference GNSS signal and the output signal of the voltage controlled oscillator is measured. In S320, the control voltage applied to the voltage controlled oscillator is measured. And in S322, the operating temperature of the voltage controlled oscillator is measured.

In one example, the control voltage applied by the cellular modem may be stepped through its full range in order to fully map the frequency behavior of the voltage controlled oscillator with respect to all possible input control voltages at the current temperature. Once the frequency, control voltage and temperature are measured, the model may then be adjusted (S324).

In general, the modeling procedure of 304 may be repeated when beneficial. During operation, the model may be continually adjusted over the lifetime of the mobile device. This ensures that the model remains up to date and accurate for estimating the frequency of the oscillator signal in case the transfer function drifts over time.

It is noted that the initial model provides a benefit to the user of the mobile device in that the mobile device may be accurate out-of-the-box. It is also noted that the continuous adjustments of the model may maintain accurate estimates over the lifetime of the product. It is further noted that the adjustment of the model may be performed automatically (e.g. periodically) by the host processor.

Although the invention is illustrated and described herein with reference to specific embodiments, the invention is not intended to be limited to the details shown. Rather, various modifications may be made in details with the scope and range of equivalence of the claims and without departing from the invention.

The invention claimed is:

1. A mobile communication device including:
a global navigation satellite system (GNSS) receiver for receiving GNSS signals;
a radio frequency (RF) receiver for receiving RF signals;
a voltage controlled oscillator supplying an oscillator signal to the GNSS receiver and the RF receiver, the GNSS receiver and the RF receiver using the oscillator signal to receive the GNSS signals and the RF signals; and
a processor configured to:
initialize a model of a frequency behavior of the voltage controlled oscillator by stepping a control voltage of the voltage controlled oscillator through a predetermined dynamic range and measuring an operating temperature and an oscillation frequency at each step, and
use the initialized model and the oscillator signal to track the GNSS signals when computing a location of the mobile communication device.

2. The mobile communication device of claim 1,
wherein the processor is configured to:
receive data representing the operating temperature of the voltage controlled oscillator,
receive data representing the control voltage applied to the voltage controlled oscillator,
receive data representing a frequency of the oscillator signal,
receive data representing a reference frequency of a reference signal received by the mobile communication device, and
initialize the model based on the received data.

3. The mobile communication device of claim 2,
wherein the reference signal is a radio frequency (RF) signal provided to the mobile communication device during manufacturing of the mobile communication device, the model being initialized based on the reference signal.

4. The mobile communication device of claim 2,
wherein the reference signal is one of the GNSS signals received by the mobile communication device during operation and corrected for Doppler shift, the model being adjusted based on the reference signal.

5. The mobile communication device of claim 4,
wherein the processor estimates a frequency of the oscillator signal based on the model, a measured control voltage applied to the voltage controlled oscillator and a measured temperature of the voltage controlled oscillator.

6. The mobile communication device of claim 4,
wherein the processor is configured to determine that the RF receiver is not receiving the RF signals before adjusting the model.

7. The mobile communication device of claim 1, wherein the processor configured to update the initialized model by:
receiving data representing the temperature of the voltage controlled oscillator,
applying the control voltage to the voltage controlled oscillator to control a frequency of the oscillator signal, and
varying the control voltage through the predetermined dynamic range to determine oscillator signal frequencies, and update the model based on the determined frequencies at a temperature corresponding to the received temperature data.

8. A mobile communication device including:
a global navigation satellite system (GNSS) receiver for receiving GNSS signals;
a cellular receiver for receiving cellular signals;
a voltage controlled oscillator supplying an oscillator signal to the GNSS receiver and the cellular receiver, the GNSS receiver and the cellular receiver using the oscillator signal to receive the GNSS signals and the cellular signals; and a processor configured to:
determine when the cellular receiver is not receiving cellular signals,
when the cellular receiver is not receiving cellular signals adjust a model of a frequency behavior of the voltage controlled oscillator by comparing a frequency of the oscillator signal to a reference frequency of a reference signal while varying a control voltage applied to the voltage controlled oscillator through a predetermined dynamic range at a measured temperature, and
use the adjusted model to estimate the frequency of the oscillator signal to track the GNSS signals when computing a location of the mobile communication device.

9. The mobile communication device of claim 8,
wherein the processor adjusts the model by varying the control voltage applied the voltage controlled oscillator when the cellular receiver is not receiving cellular signals.

10. The mobile communication device of claim 8,
wherein the reference signal is generated during manufacturing of the mobile communication device, and the model is an initial model initialized based on the manufacturer generated reference signal.

11. The mobile communication device of claim 8,
wherein the reference signal is one of the tracked GNSS signals corrected for Doppler shift, and the model is a model adjusted during operation of the mobile communication device.

12. The mobile communication device of claim 8,
wherein the processor is configured to determine when to adjust the model based on at least one of a periodic schedule and the measured temperature.

13. The mobile communication device of claim 8,
wherein the processor is configured to adjust the model when the cellular receiver is not receiving the cellular signals, and a received power of the reference signal is above a predetermined threshold.

14. The mobile communication device of claim 8,
wherein the processor is configured to adjust the model based on a difference between the reference frequency of the reference signal and the frequency of the oscillator signal.

15. A method for controlling a mobile communication device including a global navigation satellite system (GNSS) receiver for receiving GNSS signals, a radio frequency (RF) receiver for receiving RF signals, a voltage controlled oscillator supplying an oscillator signal to the GNSS receiver and the RF receiver, and a processor for controlling the mobile communication device, the method including the steps of:
determining when the cellular receiver is not receiving cellular signals,
when the cellular receiver is not receiving cellular signals adjusting, by the processor, a model of a frequency behavior of the voltage controlled oscillator by comparing a frequency of the oscillator signal to a reference frequency of a reference signal while varying a control voltage applied to the voltage controlled oscillator through a predetermined dynamic range at a measured temperature, and
using, by the GNSS receiver, the oscillator signal and the model to track the GNSS signals when computing a location of the mobile communication device.

16. The method of claim 15, further including:
adjusting, by the processor, the model by computing a difference between the frequency of the oscillator signal and the frequency of the reference signal at the measured temperature, and
varying the control voltage through a predetermined operational range of the voltage controlled oscillator.

17. The method of claim 15, further including repeatedly adjusting the model during operation of the mobile communication device by comparing a frequency of the oscillator signal to a reference frequency of a reference signal while varying a control voltage applied to the voltage controlled oscillator at a plurality of measured temperatures.

18. The method of claim 15, further including:
initializing the model during manufacturing of the mobile communication device by using a continuous wave test signal generated by the manufacture as the reference signal, and
adjusting the model during operation of the mobile communication device by using one of the GNSS signals as the reference signal.

19. The method of claim 15, further including determining, by the processor, if the cellular receiver is receiving cellular signals,
wherein, when the cellular receiver is receiving cellular signals, delaying adjusting the model until the cellular receiver is not receiving cellular signals.

20. The method of claim 15,
determining, by the processor, when to adjust the model based on at least one of the measured temperature of the mobile communication device and a received power of the reference signal.

* * * * *